United States Patent [19]

Hale et al.

[11] Patent Number: 4,787,130

[45] Date of Patent: Nov. 29, 1988

[54] AIR PRESSURE MANIFOLD FOR VALVE REPAIR

[76] Inventors: Rodney D. Hale, 106 Stewart La., Germantown, Ohio 45327; Donald R. Heindl, 311 Orphans Rd., Eaton, Ohio 45320

[21] Appl. No.: 618,007

[22] Filed: Jun. 6, 1984

[51] Int. Cl.[4] ............................................ B23P 19/04

[52] U.S. Cl. ...................................... 29/213.1; 29/252

[58] Field of Search ............. 29/213, 252; 254/93 HP, 254/423, 89 H; 137/883, 614.06; 251/149.6

[56] References Cited

U.S. PATENT DOCUMENTS

| | | | |
|---|---|---|---|
| 1,898,720 | 2/1933 | Elder . | |
| 3,350,063 | 10/1967 | Thurlow et al. | 254/423 |
| 3,898,726 | 8/1975 | Godart et al. . | |
| 3,928,711 | 12/1975 | Jakobsen | 137/883 |
| 4,158,318 | 6/1979 | Strametz . | |
| 4,171,631 | 10/1979 | Butts | 254/93 HP |
| 4,174,094 | 11/1979 | Valdespino et al. | 254/423 |
| 4,294,141 | 10/1981 | Miller | 254/93 HP |
| 4,465,094 | 8/1984 | Huffhines et al. | 137/883 |

FOREIGN PATENT DOCUMENTS

| | | | |
|---|---|---|---|
| 79/00022 | 1/1979 | PCT Int'l Appl. | 254/93 HP |

*Primary Examiner*—Robert C. Watson

*Attorney, Agent, or Firm*—Biebel, French & Nauman

[57] ABSTRACT

Apparatus for use in repairing internal combustion engines by admitting air under pressure into selected cylinders of the engine comprises a manifold including an inlet fitting for connection to a source of compressed air, at least two primary outlet fittings on the manifold, two corresponding primary spark plug hole fittings, and primary hoses connecting the primary outlet fittings to corresponding ones of the hole fittings to provide at least two primary air circuits. The manifold also has at least one secondary air circuit comprising an outlet fitting including a normally closed check valve, at least one secondary spark plug hole fitting and a secondary hose connecting it to a nipple fitting which can interlock with and open the associated check valve. With four secondary circuits the apparatus can be used with a large variety of engines, including in-line 4 and 6 cylinder; 2, 6, or 8 cylinder V-type, and 4 and 6 cylinder opposed type.

2 Claims, 1 Drawing Sheet

AIR PRESSURE MANIFOLD FOR VALVE REPAIR

BACKGROUND OF THE INVENTION

This invention relates to the repair of overhead valve mechanisms for internal combustion engines. For many years it has been known that certain valve train repairs can be accomplished without removing the cylinder head or heads. Typically, broken or weak valve springs, or related parts, can be removed and replaced by removing the valve cover and whatever of the rocker arms as are necessary. Such repair operations are possible on both push-rod and overhead cam assemblies.

With the more recent use of high speed, high compression engines, and with metalurgical and other quality improvements in overhead valve components, the parts that require interim repair or replacement are the valve stem seals or shields. These are intended to inhibit flow of lubricant along the valve stem, through the valve guides and into the cylinders. Wear or failure of these seals or shields can result in excessive lubricant consumption and/or fouling of the corresponding spark plugs or cylinders.

Often, engines can be repaired for many additional miles (or hours) of efficient satisfactory service, merely by replacing the valve stem seals at relatively little expense.

U.S. Pat. No. 1,898,720 of Feb. 21, 1933 illustrates and describes devices for admitting air into cylinders from which valve spring tension has been released. Typically this procedure has been accomplished one cylinder at a time.

SUMMARY OF THE INVENTION

The present invention provides a manifold member through which a selected plurality of cylinders, e.g. one bank of cylinders in opposed or V-type engines, can be pressurized simultaneously. According to the invention, one such manifold can be constructed for use with any of 3, 4 or 6 cylinder in-line, 4, 6 or 8 cylinder opposed, or 4, 6 or 8 cylinder V-type engines. With in-line engines all cylinders can be pressurized, and with opposed or V-type engines one bank at a time can be pressurized.

The manifold member is provided with an inlet fitting for connection to a source of compressed air, and such inlet fitting may optionally include a manually operable control valve. The manifold is fitted with at least two primary outlet fittings and two corresponding cylinder (spark plug hole) fittings, connected by suitable lengths of primary hose, making up primary air circuits. The member of primary fittings can be greater, but air flow is direct through these primary circuits to the cylinder, thus two primary fittings allows maximum flexibility in use of a given manifold. The manifold also is fitted with at least one (preferably two) secondary outlet fitting, corresponding secondary cylinder fittings, and corresponding secondary hoses, which make up secondary air supply circuits.

The secondary circuits have quick disconnect fittings, preferably at the manifold, so they can be removed from the assemblage when not needed. These quick disconnect fittings include check valves, of conventional design, that close unless the secondary circuits are completed and used. Thus, by adding one or more secondary circuits the mechanic can quickly arrange the manifold assembly to correspond to the job confronting him. He can then pressurize simultaneously the number of cylinders he wants and quickly make the necessary repairs.

The principal object of the invention, therefore, is to provide a manifold assembly for pressurizing multiple cylinder, comprising a manifold member with an inlet fitting, at least two primary air circuits outgoing from the manifold directly to cylinder fittings, and at least one secondary air circuit which also incorporates a normally closed check valve that allows air flow into and through the secondary circuit only when it is assembled to the manifold; and to provide such a manifold assembly which is easily and quickly adaptable for use in repairing a wide variety of engines.

Other objects and advantages of the invention will be apparent from the following description, the accompanying drawings and the appended claims.

DESCRIPTION OF PREFERRED EMBODIMENT

Figure 1:
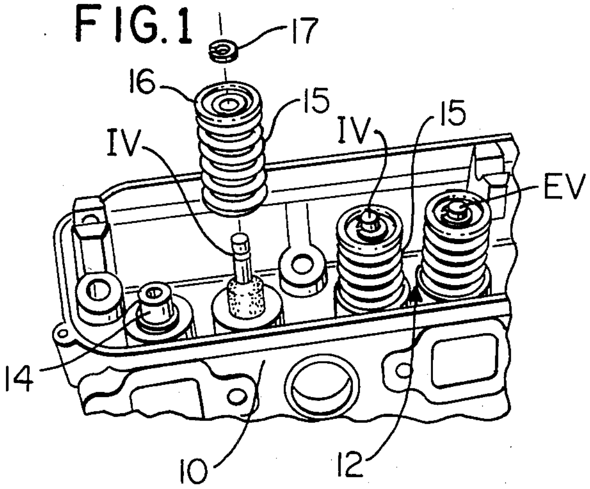
FIG. 1 is a partial perspective view showing several valves in a head of an overhead valve engine.
Figure 2:
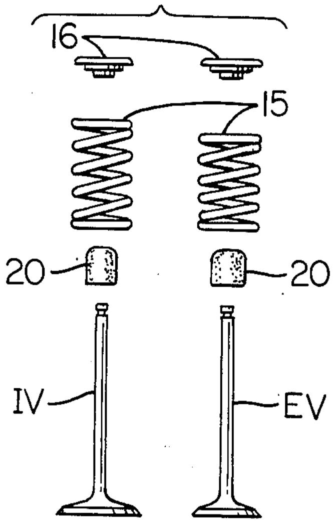
FIG. 2 is an exploded view of one valve and related parts.
Figure 3:
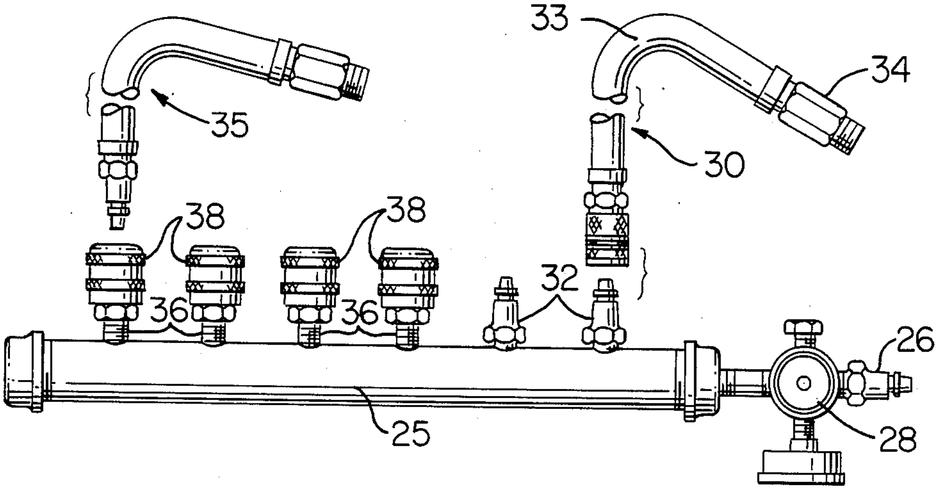
FIG. 3 is a perspective view of a manifold assembly as provided by the invention.

The head 10 of an engine includes a valve train gallery 12 which normally is fitted with a cover (not shown). Each cylinder has at least one intake valve IV and exhaust valve EV supported in guide tubes 14, and having a valve spring 15. The spring is seated against the head around the upper end of the guide tube and presses upward on a retainer ring 16 which is held to the valve stem by a spring clip 17, thereby urging the valve head to close against the corresponding port within the head, over the combustion chamber. The valves are opened in sequence by the usual rocker arms (not shown) which mount in the head in conventional fashion and are actuated by cams and/or push rods in known manner. These parts are omitted from FIG. 1, as if they were removed preparatory to working on the valve springs, etc. however it is assumed that the head 10 is still fitted to the engine block.

Each valve is fitted with a seal 20, usually of a suitable inverted elastomer cup, which fits tightly to the valve stem and over the upper end of the guide tube 14. To replace these seals 20 and/or the valve springs 15, the valve cover and rocker arms are removed, the spring is compressed to relieve pressure on the spring clip 17 which is then withdrawn, and the retainer ring, spring, and seal can be removed.

To hold the valve seated, stem full up, during this operation it is customary to pressurize the engine cylinder with compressed air as explained in the aforementioned U.S. Pat. No. 1,898,720. However, in working on multi-cylinder engines, particularly replacing all the seals 20, it is desirable to pressurize all the cylinders in one bank.

The manifold assembly provided by this invention allows the mechanic to accomplish this pressurizing easily with a substantial variety of engines. The main manifold 25 has an inlet fitting 26, which may optionally include a control valve 28. The manifold has a plurality of primary outlet circuits 30, each of which includes an outlet fitting 32 on manifold 25, a flexible connecting tube 33 of suitable length, and a cylinder fitting 34 adapted to be threaded, for example, into the spark plug opening of a selected cylinder. Each of the primary circuits is under pressure whenever air under pressure is supplied to the manifold.

The manifold 20 also has one or more secondary circuits 35, each of which includes a manifold fitting 36 onto which a normally closed check valve 38 is mounted, to block air flow from the manifold. These valves are of conventional type and are opened upon insertion of a snap-in nipple fitting 39 attached to one end of a flexible tube or hose 40 that has a cylinder fitting 34A, of the same type as fitting 34. The secondary circuit parts 39, 40, and 34A are supplied in numbers (usually four) and lengths as required.

With the inlet fitting connected to a compressed air source if valve 28 is opened the primary circuits are pressurized. A desired number of secondary circuits are added by plugging into one or more valves 38, at which time each of those are available to be pressurized. Unless the assembly is being used with one bank of an opposed 4 or V-4 engine, at least one secondary circuit will be added. Thus, by having on the manifold 25 two primary fittings 32 and four secondary fittings 36, with check valves 38, the assembly is quickly readied for use with a large variety of engines.

While the form of apparatus herein described constitutes a preferred embodiment of this invention, it is to be understood the invention is not limited to this precise form of apparatus, and that changes may be made therein without departing from the scope of the invention which is defined in the appended claims.

What is claimed is:

1. Apparatus for use in the repair of different types of multi-cylinder internal combustion engines by admitting air under pressure into selected cylinders of the engine to seat all the corresponding valves, comprising a manifold member including an inlet fitting for connection to a source of compressed air, at least two primary outlet fittings on said manifold, at least two primary spark plug hole fittings, primary hoses connecting each of said primary outlet fittings to a corresponding one of said hole fittings to provide at least two primary air circuits, at least one secondary outlet fitting on said manifold including a normally closed check valve, at least one secondary spark plug hole fitting and a secondary hose connected thereto at one of the hose ends and a nipple fitting on the other hose end adapted to interlock with and open the associated check valve, whereby the apparatus can be used in the repair of a variety of engines by simultaneously pressurizing the selected cylinders as repairs are made.

2. Apparatus for use in the repair of overhead valve systems in different types of multi-cylinder internal combustion engines by admitting air under pressure into selected cylinders of the engine to seat all the corresponding valves, comprising a manifold member including an inlet fitting for connection to a source of compressed air, at least two primary air circuits each including outlet fittings on said manifold and spark plug hole fittings and flexible hoses connecting each of said outlet fittings to a corresponding one of said hole fittings, at least one secondary air circuit including an outlet fitting on said manifold including a normally closed check valve and a further spark plug hole fitting and a flexible secondary hose connected at one end thereto, a nipple connector at the other hose end adapted to interlock with and open said check valve, whereby selected cylinders of an engine can be pressurized simultaneously.

* * * * *